United States Patent [19]

Richards

[11] 4,103,704
[45] Aug. 1, 1978

[54] SAFETY RELIEF VALVE

[75] Inventor: Donald L. Richards, Durham, N.C.

[73] Assignee: Eaton Corporation, Cleveland, Ohio

[21] Appl. No.: 769,144

[22] Filed: Feb. 16, 1977

[51] Int. Cl.² .................. F16K 15/06; F16K 17/08
[52] U.S. Cl. .................................................. 137/522
[58] Field of Search ............... 137/522, 523; 251/82

[56] References Cited

U.S. PATENT DOCUMENTS

| | | | |
|---|---|---|---|
| 2,547,862 | 4/1951 | Gilmore | 137/522 X |
| 2,954,792 | 10/1960 | Hagger | 137/522 |
| 3,085,753 | 4/1963 | Braun et al. | 285/DIG. 22 |
| 3,123,092 | 3/1964 | Kmiecik et al. | 137/522 X |
| 3,662,950 | 5/1972 | McIntosh et al. | 137/522 X |

Primary Examiner—William R. Cline
Attorney, Agent, or Firm—R. J. McCloskey

[57] ABSTRACT

A valve for relieving pressure in a container including an adjustably spring loaded poppet wherein the adjusting means therefor is covered by an actuator knob which drivingly engages the poppet which knob is operable to move the poppet to and from its operative sealing position through engagement of a projection formed in the knob with a cam surface formed on the valve housing. Indentations in the cam surface retain the knob in positions corresponding to sealing and open positions of the poppet.

9 Claims, 3 Drawing Figures

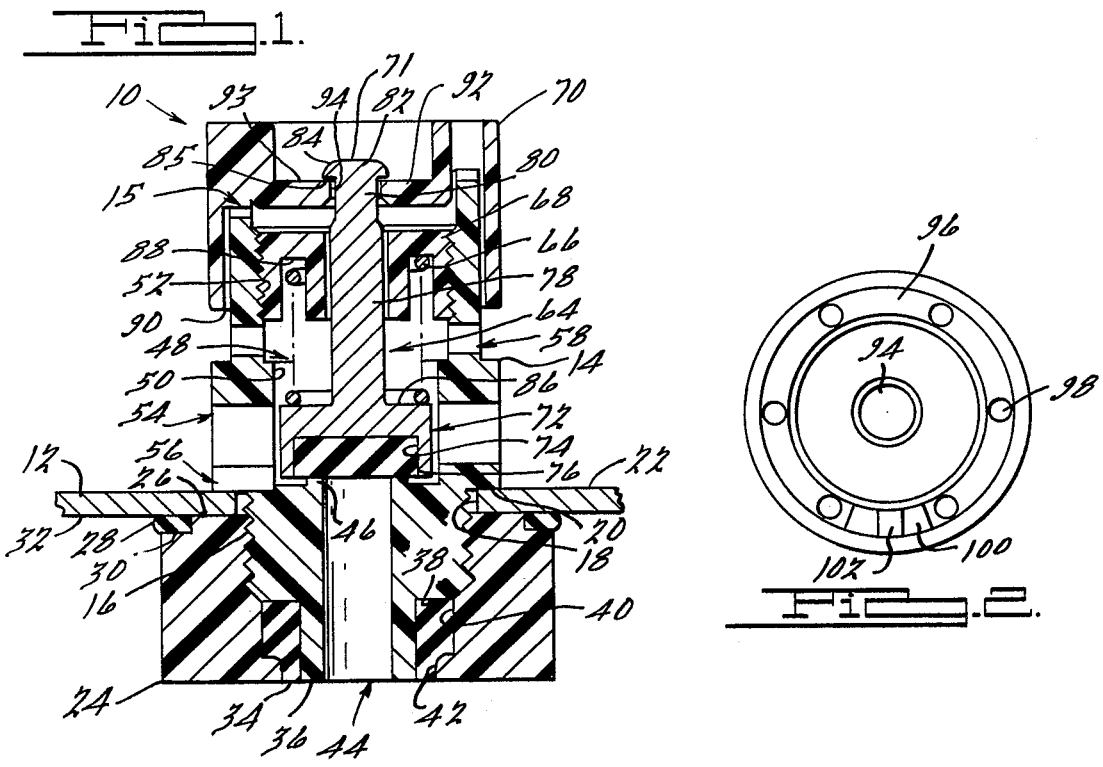
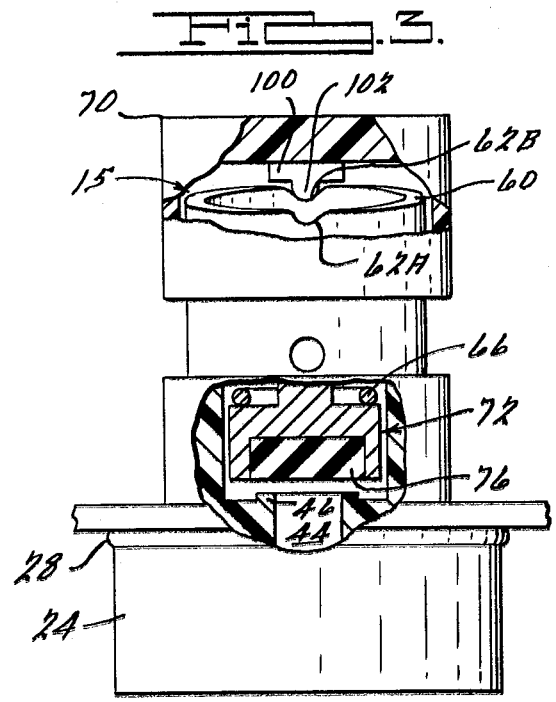

SAFETY RELIEF VALVE

BACKGROUND OF THE INVENTION

1. Field of the Invention

The present invention relates generally to pressure relief valves and more specifically to such valves which include provisions for manual opening thereof.

2. Description of the Prior Art

Manually operable poppet-type relief valves are often used for limiting the pressure in and for depressurizing and draining fluid from enclosures. In such applications the valves generally employ a spring loaded poppet operating conventionally in response to pressure increases in the enclosure to bleed off fluid to effect the pressure limiting function. Draining is accomplished through manually displacing the poppet to overcome the closing force of its load spring and thereby open the valve.

Certain disadvantages have been noted, however, in the use of the prior art valves. One disadvantage has been that the mechanisms employed to manually open the valves have been operable by manual displacement in a single direction, thereby allowing inadvertent opening of the valves.

Another disadvantage in certain prior art valves has been that the opening mechanisms have employed means for connection to the valve poppet which leave exposed beyond the major structural confines of the valve, elements rigidly fixed to the poppet itself, thereby permitting interference with its freedom of operation.

Still another disadvantage has been that the prior art valves have been expensive to produce.

SUMMARY OF THE INVENTION

Responsive to the cited disadvantages in the prior art valves it is an object of the present invention to provide a poppet-type pressure relief valve requiring compound motion for its manual opening.

It is another object to provide a valve in which no element fixed to the poppet extends beyond the structural limits of the valve.

It is still another object to provide a manually operable poppet-type pressure relief valve which is inexpensive to produce.

According to one feature of the invention, a poppet-type relief valve is provided which includes an actuator knob which is moved axially and then rotated to move the valve poppet axially to open the valve.

According to another feature the driving connection between the actuator knob and the poppet is recessed within the structural confines of the valve.

BRIEF DESCRIPTION OF THE DRAWINGS

These and other objects and features will be apparent to those skilled in the valve art upon reference to the accompanying specification and drawings in which:

FIG. 1 is a cross-sectional view of the invention valve in the closed position;

FIG. 2 is a plan view of the lower side of the actuator knob of the invention valve; and FIG. 3 is a partial cross-sectional view of the invention valve in the open position.

DESCRIPTION OF THE PREFERRED EMBODIMENT

Referring first to FIG. 1, the invention pressure relief valve 10 is illustrated as it is preferrably installed in a pressurized tank such as a carbonated beverage tank, one wall of which is illustrated at 12. The invention valve 10 includes a valve housing body 14 including an externally threaded portion 16 which is inserted through an aperture 18 formed through the wall 12 to a position where a shoulder 20 bottoms on the outer surface 22 of the wall 12. A retaining nut 24 threadedly engages the externally threaded portion 16 to clampingly engage the wall 12 between the top surfaces 26 of the nut 24 as viewed in FIG. 1 and the shoulder 20. An elastomeric sealing ring 28 is compressed between an annular shoulder 30 of the nut 24 and the inner surface 32 of the wall 12 to prevent leakage between the nut 24 and the wall 12. A stepped elastomeric grommet 34 effects a fluid seal between the nut 24 and the valve body housing 14. This is accomplished by the grommet 34 compressively engaging the outer diameter of a tubular portion 36 extending from the threaded portion 16 of housing 14, an annular shoulder 38 at the terminus of threaded portion 16, and the inner diameters of central bore 40, 42 of the nut 24.

Turning now in more detail to the construction of the valve body housing 14, it is illustrated as being of generally cylindrical configuration and is preferably fabricated as a molded plastic part. It includes an inlet passage 44 preferably formed on its longitudinal axis and passing through the threaded and tubular portions 16, 36. The inlet passage 44 terminates at an annular sealing surface 46 and is in communication with a preferably concentric axially extending valve bore 48 which includes a reduced diameter valve portion 50 and an internally threaded portion 52.

Also communicating with the valve bore 48 are a plurality of outlet passages 54 which are preferably open to atmosphere. At least one of the outlet passages 54 has a slot 56 formed on its lowest surface terminating at the upper surface 22 of wall 12.

Additional communication with the valve bore 48 is effected adjacent the internally threaded portion 52 through vent passages 58.

As may best be seen in FIG. 3 the upper end 15 of the valve body housing 14 is formed as an annular double helical cam surface 60. A pair of detent slots or indentations 62a and 62b traverse the annular cam surface 60 for purposes to be made clear below.

Received within the valve bore 48 of the housing 14 are a poppet assembly 64, a load spring 66 and an adjusting seat 68. Receiving the upper end 15 of the housing 14 is an actuator knob 70.

The poppet assembly 64 is preferably generally T-shaped in cross-section and fabricated from metal and includes an enlarged sealing portion 72 which is received in close fit relationship in the valve portion 50 of valve bore 48. A counterbore 74 is formed in the end of sealing portion 72 for receiving an elastomeric sealing element 76 in press fit relationship. A cylindrical stem portion 78 extends upward from the sealing portion 72 and includes a reduced diameter section 80 and a retaining portion 82 having a lead chamfer 84 formed at its end.

A flat annular seat surface 86 is formed on the upper side of the sealing portion 72 for engaging one end of the load spring 66. The other end of the spring 66 abuts another annular seat surface 88 formed in the adjusting seat 68 which is externally threaded to engage the internally threaded portion 52 of the housing 14.

Actuator knob 70 is preferably formed as a generally cup-shaped molded plastic part having an open end facing the upper end 15 of the housing 14. It includes a recessed outer wall 92 having a central through bore 94 sized slightly greater in diameter than the reduced diameter section 80 of stem portion 76 of poppet assembly 64. Retainer section 82 of poppet assembly 64 is inserted through the bore 94 for retention in snap-fit relationship.

Referring now to FIGS. 2 and 3 it may be seen that an annular channel 96 is formed in the open end 90 adjacent the recessed wall 92 registering with the cam surface 60 of the housing 14. A plurality of vent holes 98 extend through the knob 70 from this channel 96 and a raised portion 100 is positioned intermediate two of these holes 98. A detent projection or knob 102 is preferably formed integrally with the raised portion 100. The projection 102 is sized to be engageable with the indentations 62 formed in cam surface 60. It will be apparent, however, to those skilled in the valve art that the raised portion 100 and/or the integral projection 102 could be replaced by a separate knob in other configurations.

OPERATION OF THE PREFERRED EMBODIMENT

In one known design application of the invention valve, the valve 10 is installed for limiting the pressure of and for depressurizing and/or draining a carbonated beverage tank. For illustrative purposes then it can be assumed that the valve 10 is installed in the side wall of such a tank oriented in a horizontal position rotated 90° counterclockwise from the position shown in FIG. 1. It should be understood, however, that other positional orientations of the valve, such as vertical installations on top of an enclosure, are possible.

When installed as described, the inlet passage 44 is in direct fluid communication with the pressurized fluid in the tank. When the valve 10 is in the closed position illustrated in FIG. 1, actuator knob 70 is manually rotatively positioned to engage its locking projection 102 in the inward indentation 62A of cam surface 60. In this position the retainer section 82 of poppet assembly 64 is spaced below the outer end 71 of knob 70 to prevent inadvertent loading of the poppet 64 through abutting engagement of the surface 71 with another object. Retainer section 82, in this closed position of valve 10, is also spaced from the recessed wall 92 so that movement of the poppet 64 is not affected by the knob 70. A downward force determined by the axial position of the adjustable seat 68 prior to assembly of the knob which further serves to shield the seat 68 from tampering, is exerted on the poppet assembly 64 by the load spring 66. The elastomeric sealing element 76 is thus compressively urged against the annular sealing surface 46 to balance the force exerted by the pressurized fluid in the tank against the annular sealing area for normal pressure relief operation of the valve 10. When the force exerted by the pressurized fluid exceeds the spring force, pressure is relieved as the poppet 64 moves away from the seat 46 to effect communication between the inlet passage 44 and the outlet passages 54. The downward extending slot 56, terminating at the lowest point in the valve even when the valve is vertically disposed on top of an enclosure, serves to prevent the trapping of fluid in the valve 10 as a result of the relief flow of pressurized fluid. Sanitary considerations necessitate the provision of such positive drain passage for applications such as the beverage container described herein.

As the poppet assembly 64 moves away from the seat 46, the portion of the valve bore 48 above the poppet assembly sealing portion 72 is vented through vent ports 58. That portion of the valve bore 48 adjacent the recessed wall 92 of the actuator knob 70 is vented through the knob vent holes 98.

When it is desired to drain the tank or to depressurize from a value less than that needed to overcome the force exerted by the spring 66, the actuator knob is first displaced axially a distance sufficient to extract the projection 102 from the indentation 62A. In so displacing the knob 70, the outer surface 93 of recessed wall 92 engages an inner shoulder 85 of retaining section 82 of poppet assembly 64, thereby moving poppet assembly 64 against the force of the spring 66. The knob 70 is then rotated in either direction and as the projection 102, acting as a cam follower, slidingly engages the cam surface 60, the knob 70 is further displaced axially against the spring force and substantially rotatively free of the poppet assembly 64. Upon reaching the fully open position shown in FIG. 3, the projection 102 is brought into engagement with outer cam surface indentation 62B and the valve will retain this open position until the knob 70 is again axially displaced to extract the projection 102 from indentation 62B and is rotated in either direction to the closed position of FIG. 1. The two step motion required to change valve position advantageously tends to prevent inadvertent changing of the valve position and is therefor desirable where users of such valves may not be highly technically trained.

While only one embodiment of the invention valve has been disclosed, others may be possible without departing from the scope of the invention as claimed.

What is claimed is:

1. A relief valve comprising:
   A. housing means including:
      1. means defining a valve passage therein;
      2. means defining a fluid inlet port communicating with said passage and adapted for connection to a source of pressurized fluid;
      3. means defining a fluid outlet port communicating with said valve bore;
      4. means defining a cam surface remote from said inlet port and including detent means provided on said cam surface;
   B. a poppet member disposed within said valve passage and movable therein between a sealing position wherein one portion of said poppet member blocks communication between said inlet and outlet port means and an open position permitting fluid communication between said inlet and outlet ports; and
   C. a generally cup-shaped acutator knob having:
      1. an open end with the portion of said housing means having said cam surface received therein;
      2. means defining a projection within said open end for selective engagement with said detent means;
      3. means for effecting driving engagement of said knob with second portions of said poppet member remote from said fluid blocking portion upon axial movement of said knob from a first position and rotation of said knob to a second position, thereby effecting movement of said poppet member from said sealing position to said open position and 4. means formed in said knob defining a fluid outlet port communicating with said valve bore.

2. A relief valve as defined in claim 1, wherein said
A. poppet member includes a valve portion at said one end an elongated stem portion extending axially therefrom and defining an enlarged retaining portion at said other end;
B. said actuator knob includes a recessed end wall having a central aperature for receiving said poppet member retaining portion in snap fit relationship.

3. A relief valve as defined in claim 1 and further comprising means for exerting a resilient biasing force urging said poppet member toward said sealing position.

4. A relief valve as defined in claim 3 and further comprising means for adjusting said biasing force, said adjustment means being disposed within said housing means intermediate said one poppet member portion and said actuator knob.

5. A relief valve as defined in claim 1, wherein said cam defining means defines an annular helical spiral surface.

6. A relief valve as defined in claim 1, wherein said projection is integrally formed with said knob.

7. A relief valve as defined in claim 1, in which said means formed in said knob defining a fluid outlet port comprise a plurality of ports extending axially through said knob.

8. A relief valve comprising:
A. housing means including means defining a valve passage therein and means defining an inlet port and an outlet port communicating with said passage;
B. a poppet member disposed within said passage fluidly intermediate said inlet and outlet port and movable between a closed position in which said poppet is operative to prevent communication therebetween and an open position permitting fluid communication through said passage from said inlet port to said outlet port;
C. a generally cup-shaped actuator knob having an open end rotatably received over one end of said housing means;
D. means defining a cam surface on said one end of said housing means;
E. means defining a cam follower in said knob disposed within said open end for selective engagement with said cam surface;
F. means for resiliently biasing said poppet member to said closed position;
G. means for effecting driving engagement of said knob with said poppet member upon axial movement of said knob from a first position wherein said cam follower engages first portions of said cam surface and subsequent rotation of said knob to a second position wherein said cam follower is urged into engagement with second portions of said cam surface by said biasing means thereby driving said poppet member to said open position and
H. means formed in said knob defining a fluid outlet port communicating with said valve passage in said housing means.

9. A relief valve comprising:
A. housing means defining a flow passage therethrough and including means defining an inlet port and an outlet port in said passage and including means remote from said inlet port defining surfaces adapted for attachment of an actuator thereto;
B. a poppet member disposed in said passage intermediate said inlet and outlet ports, said poppet having a valve portion and a stem portion and being movable between a closed position in which said valve portion cooperates with certain portions of said passage to block fluid flow therethrough and an open position permitting fluid flow;
C. means biasing said poppet to the closed position with a predetermined force;
D. an actuator having a cup-shaped configuration with the open end thereof rotatably received over said attachment surfaces, and with the closed end portion thereof having a receptacle means therein for rotatably receiving the stem portion of said poppet such that, upon axial movement of said actuator with respect to said housing, said actuator is operative to move said poppet seat portion from said closed to said open position; said actuator having means formed therein defining a fluid outlet port; and
E. cam means operable upon rotation of said actuator to move said actuator axially with respect to said housing means, said cam means including at least one detent means for rotational registering of said knob.

* * * * *